(12) United States Patent
Franceschini et al.

(10) Patent No.: US 9,146,882 B2
(45) Date of Patent: Sep. 29, 2015

(54) SECURING THE CONTENTS OF A MEMORY DEVICE

(71) Applicant: International Business Machines Corporation, Armonk, NY (US)

(72) Inventors: Michele M. Franceschini, White Plains, NY (US); Hillery C. Hunter, Deerfield, IL (US); Ashish Jagmohan, Irvington, NY (US); Charles A. Kilmer, Essex Junction, VT (US); Kyu-hyoun Kim, Mount Kisco, NY (US); Luis A. Lastras-Montano, Cortlandt Manor, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/758,442

(22) Filed: Feb. 4, 2013

(65) Prior Publication Data

US 2014/0223120 A1    Aug. 7, 2014

(51) Int. Cl.
*G06F 12/16* (2006.01)
*G06F 12/14* (2006.01)
(Continued)

(52) U.S. Cl.
CPC ............ *G06F 12/16* (2013.01); *G06F 12/1483* (2013.01); *G06F 21/00* (2013.01); *G06F 21/62* (2013.01); *G06F 2221/2143* (2013.01)

(58) Field of Classification Search
CPC ....................................................... G06F 12/16
USPC ....................................................... 711/162
See application file for complete search history.

(56) References Cited

U.S. PATENT DOCUMENTS

| 5,903,717 A | * | 5/1999 | Wardrop | .......................... 714/12 |
| 2005/0033978 A1 | * | 2/2005 | Hyser | ............................ 713/200 |
| 2006/0119379 A1 | * | 6/2006 | Carlson | ............................ 326/14 |

(Continued)

FOREIGN PATENT DOCUMENTS

| JP | 2005209074 A | 4/2005 |
| JP | 2007109148 A | 4/2007 |
| JP | 2011203927 A | 10/2011 |

OTHER PUBLICATIONS

Halderman et al. "Lest We Remember: Cold Boot Attacks on Encryption Keys", Proc. 2008 USENIX Security Symposium, released Feb. 21, 2008, pp. 1-16. http://citpsite.s3-website-us-east-1.amazonaws.com/oldsite-htdocs/pub/coldboot.pdf.

(Continued)

*Primary Examiner* — Cheng-Yuan Tseng
*Assistant Examiner* — Zubair Ahmed
(74) *Attorney, Agent, or Firm* — Richard A. Wilhelm; Robert Williams

(57) ABSTRACT

A memory device may be equipped with quick erase capability to secure the contents of the memory device. The quick erase capability may effectively permanently disable access to data stored in the memory device instantaneously upon a command being issued, making all previous data written to the memory device unreadable. The quick erase capability may allow use of the memory device for new write operations and for reading the newly written data immediately once the erase command is received and executed. The quick erase capability may begin a physical erase process of data not newly written without altering other aspects of the quick erase. Aspects may be accomplished with one or more bits per row in a memory device.

21 Claims, 5 Drawing Sheets

(51) Int. Cl.
*G06F 21/00* (2013.01)
*G06F 21/62* (2013.01)

(56) References Cited

U.S. PATENT DOCUMENTS

| | | | |
|---|---|---|---|
| 2007/0124534 | A1 | 5/2007 | Iwata |
| 2009/0144557 | A1 | 6/2009 | Sutton |
| 2009/0147580 | A1 | 6/2009 | Lee |
| 2010/0115175 | A9 | 5/2010 | Zhuang et al. |
| 2010/0211725 | A1 | 8/2010 | Nagashima et al. |
| 2011/0154059 | A1 | 6/2011 | Durham et al. |
| 2012/0151223 | A1 | 6/2012 | Conde Marques et al. |
| 2013/0019054 | A1* | 1/2013 | Jung et al. .................. 711/103 |

OTHER PUBLICATIONS

IBM, "Method and System for Bit-Fail Mapping of Embedded Dynamic Random Access Memory (DRAM) Arrays", IP.com Prior Art Database, published Oct. 7, 2009, pp. 1-3, IP.com No. IPCOM000188434D. http://www.ip.com/pubview/IPCOM000188434D.

* cited by examiner

SECURING THE CONTENTS OF A MEMORY DEVICE

TECHNICAL FIELD

This disclosure relates generally to secure computing and more particularly to securing the contents of memory devices.

BACKGROUND

In order to protect information, the ability to quickly prevent access to stored data may be useful. For example, individuals utilizing cloud computing may want to be able to wipe clean a main memory of a cloud machine. Another example is physical access to shared physical resources such as servers. Dynamic random access memory (DRAM) devices may retain their contents for a period of time without power or without refreshing. Unauthorized parties with physical access may use known ways such as cold-boot attacks to exploit DRAM devices. Also, persistent memory technologies such as phase-change memory can be very slow to write or erase while posing security concerns such as the theft of a non-volatile dual inline memory module (DIMM). The tedious process of erasing by overwriting all memory with some pattern may not be fast enough to prevent access to the data.

SUMMARY

A memory device may be equipped with quick erase capability to secure the contents of the memory device. The quick erase capability may effectively permanently disable access to data stored in the memory device instantaneously upon a command being issued, making all previous data written to the memory device unreadable. The quick erase capability may allow use of the memory device for new write operations and for reading the newly written data immediately once the erase command is received and executed. The quick erase capability may begin a physical erase process of data not newly written without altering other aspects of the quick erase. Aspects may be accomplished with one or more bits per row in a memory device.

DETAILED DESCRIPTION

In order to protect information, the ability to quickly prevent access to stored data may be useful. For example, individuals utilizing cloud computing may want to be able to wipe clean a main memory of a cloud machine. Another example is physical access to shared physical resources such as servers. Dynamic random access memory (DRAM) devices may retain their contents for a period of time without power or without refreshing. If a person, whether authorized or unauthorized, may physically control the DRAM device, the person may then read the contents of the DRAM device regardless of other factors (e.g., power). Also, persistent memory technologies such as phase-change memory can be very slow to write or erase while posing security concerns such as the theft of non-volatile DIMMs. The tedious process of erasing by overwriting all memory with some pattern may not be fast enough to prevent access to the data. Other possibilities such as a self-destruct of the interface to secure the stored data may render the data or memory device entirely useless. A quick erase aspect of a memory device may be useful in securing the contents of the memory device.

A memory device may be equipped with quick erase capability to secure the contents of the memory device. The quick erase capability may effectively permanently disable access to data stored in the memory device instantaneously upon a command being issued. The quick erase capability may allow use of the memory device for new write operations and for reading the newly written data immediately once the erase command is received and executed. This may allow a new operating system to boot without delay. The quick erase capability may begin a physical erase process of data not newly written without altering other aspects of the quick erase. Aspects may be accomplished with one or more bits per row in a memory device.

Figure 1:
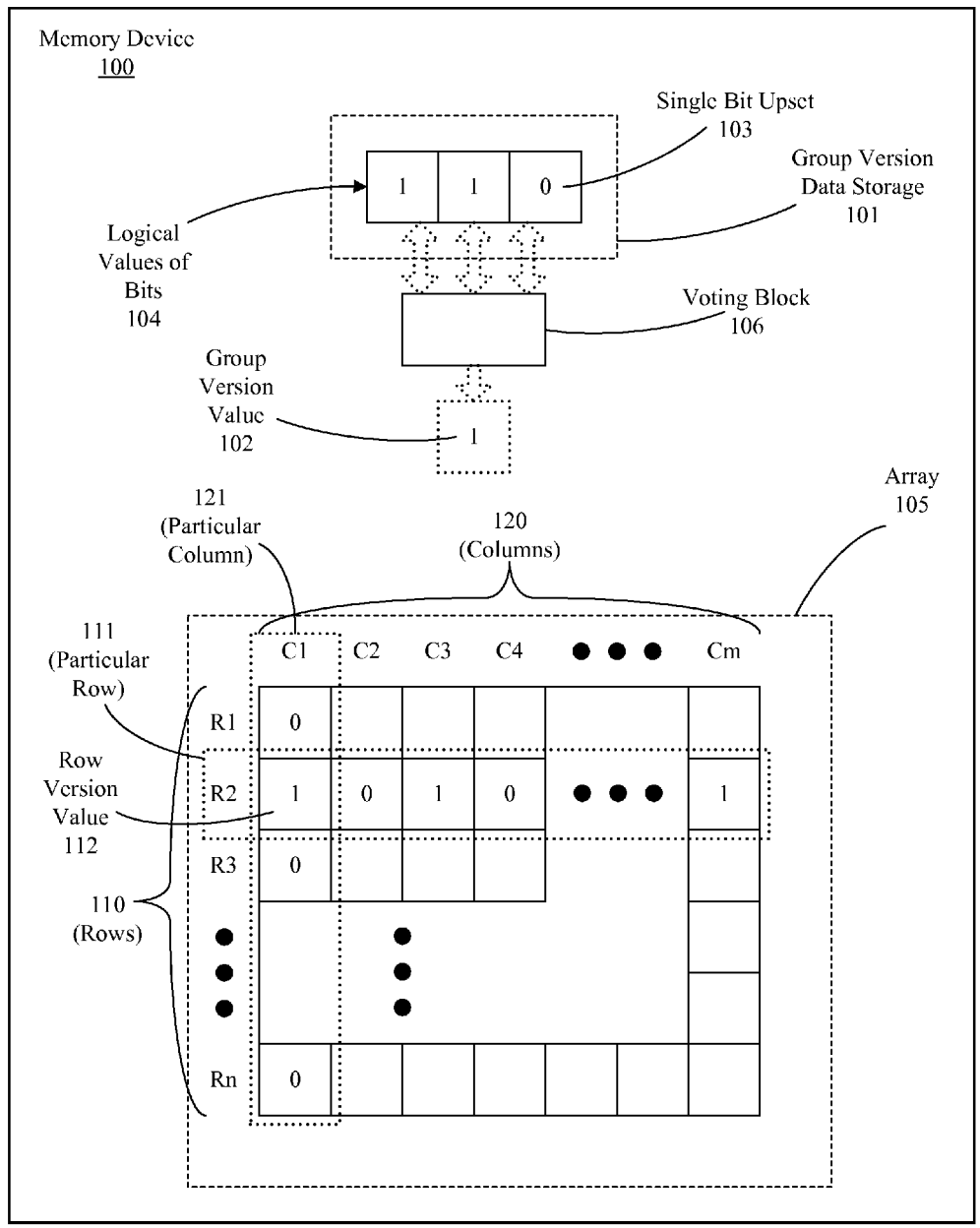
FIG. 1 diagrammatically depicts a memory device with a capability to make data written to the memory device unreadable.

FIG. 1 diagrammatically depicts a memory device 100 with a capability to make data written to the memory device 100 unreadable. Memory device 100 may include a group version data storage 101. The group version data storage may include a logical value redundantly stored in three or more storage cells 104 and may be a bit or a collection of bits. The logical value may be a group version value 102. A voting block 106 may exist and may be adapted to perform a majority voting operation to accommodate a single event upset such as a single bit upset 103. The single bit upset may be a bad bit or may be as a result of ionizing radiation. Error correcting code and scrubs may be expected to correct such an occurrence at a regular interval. The regular interval may not be soon enough in all cases. The voting block 106 may analyze the logical values 104 to determine which of the values is in the majority. In FIG. 1 for example, at least two of the three bits contain logical values of "1." The voting block 106 may designate the value "1" as the group version value. The voting block 106 may also perform an operation to correct the value of the single bit upset 103, in this example changing the value from a "0" to a "1" through an operation such as a write. Ultimately, the group version value 102 may be used to assist in making data written to the memory device 100 unreadable.

Memory device 100 may include a data storage section such as array 105. Array 105 may include a plurality of rows 110 of storage cells or bits to hold data written to the memory device 100. Typically arrays include hundreds of rows 110, represented as R1 through Rn in FIG. 1. Array 105 may include a plurality of columns 120 of storage cells or bits to hold data written to the memory device 100. Typically arrays include hundreds of columns 120, represented as C1 through Cm in FIG. 1. A particular row 111 may include a row version value 112 for the particular row 111. The row version value 112 may be in a particular column 121. In an embodiment such as group version storage 101 has multiple bits stored redundantly as described above, multiple columns are used. The particular column 121 may include row version values 112 for each row of the array 105. In embodiments, the row version value 112 may correlate to data in storage cells in a subset of a row such as a particular byte, and may effectively be a row version value 112 for the particular byte of data. In the case of the row version value 112 correlating to data in a subset of a row, the particular row 111 may include multiple row version values with each row version value 112 associated with the particular byte, for example. Row version values 112 may be stored in one or more columns such as C1, C2, and C3. In embodiments, the array 105 may include the group version data storage 101 and the group version value 102. Ultimately, the row version value 112 may be used to assist in making data previously written to the memory device 100 unreadable.

Figure 2:
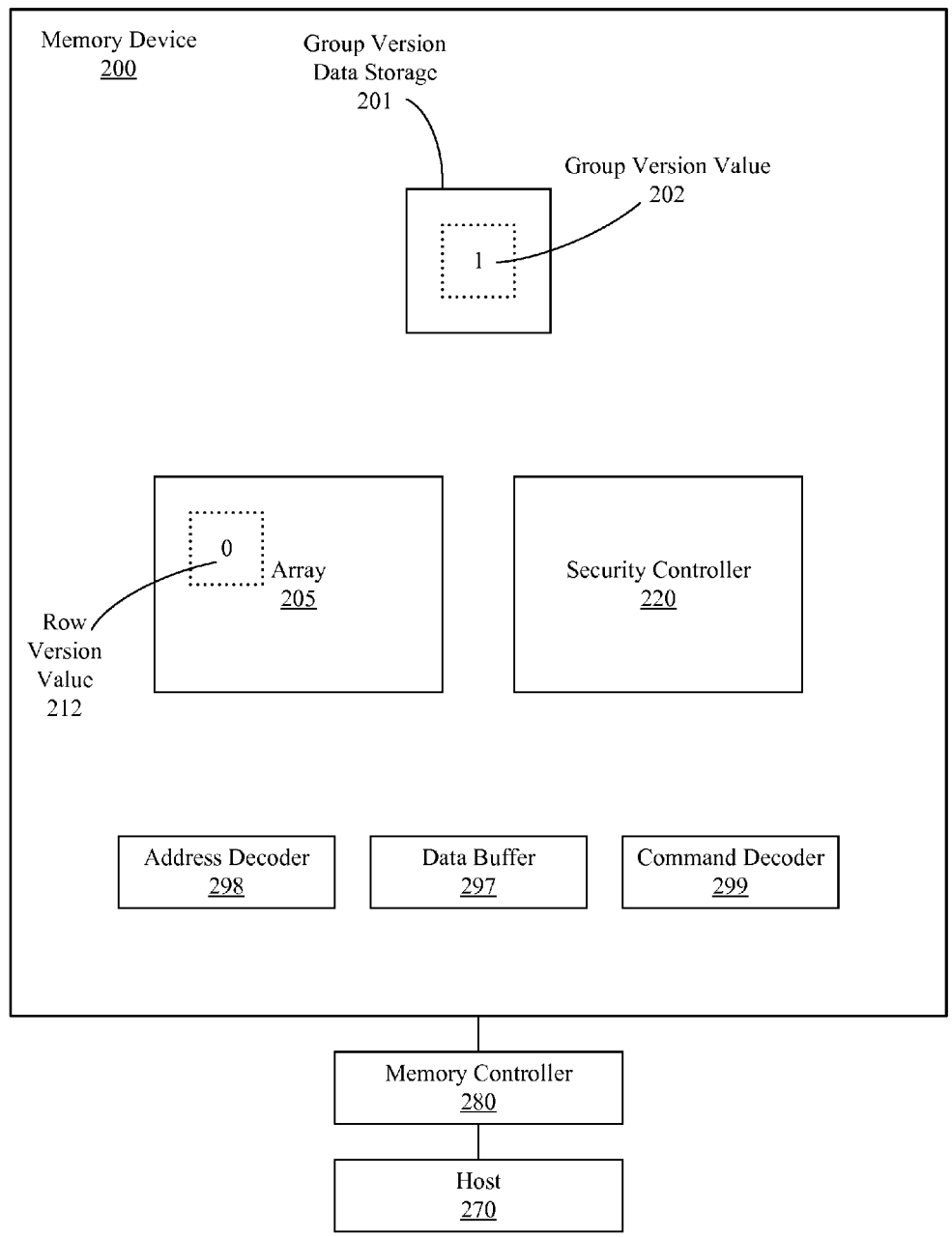
FIG. 2 diagrammatically depicts a memory device with quick erase capability to secure the contents of a memory device.

FIG. 2 diagrammatically depicts a memory device 200 with quick erase capability to secure the contents of the memory device 200. A quick erase may achieve security through a logical operation which may disable data access but may not necessarily include a physical erase. The memory device 200 may be connected to a memory controller 280 connected to a host 270. In some embodiments, the host 270 may be a processor. A read, write, or erase request to the memory device 200 may derive from the host 270 via the memory controller 280. The memory device 200 may include a data buffer 297 which may hold data potentially being read or potentially being written. The memory device 200 may include an address decoder 298 which may receive an address to select a memory location, e.g., specify a particular row and one or more columns in the particular row. The memory device 200 may include a command decoder 299 which may activate a read, a write, or an erase instruction.

Memory device 200 may include aspects similar or the same to memory device 100. Memory device 200 may include a group version data storage 201. The group version data storage 201 may be a register with a critical charge large enough so that the register is insensitive to ionizing radiation. The group version data storage 201 may include a group version value 202, similar to the group version value 102. Memory device 200 may include a data storage section such as array 205, similar to the array 105. Similar to the row version value 112, the array 205 may include a row version value 212 for a particular row or a particular subset of data such as a byte.

Memory device 200 may include a security controller 220 which may be configured to interact with other aspects of the memory device 200 during a read, write, or erase request. The security controller 220 may be configured to operate uniquely for a read, a write, or an erase. In an embodiment during a read from a particular row of the array 205, the security controller 220 may compare the group version value 202 with the row version value 212 for the particular row. When the group version value 202 matches the row version value 212 for the particular row, data may be output from the particular row. The data from the particular row may be output to the data buffer 297, and ultimately the memory controller 280 and the host 270. In effect, a security ruling was issued ruling the data readable from the particular row. When the group version value 202 fails to match the row version value 212 for the particular row, data may not be output from the particular row. In effect, a security ruling was issued ruling the data unreadable from the particular row. When the contents are ruled unreadable, the memory controller 280 and the host 270 may receive a signal denial, a known pattern, or a random pattern. Other possibilities for outputting data in response to a read request are considered.

In an embodiment during an erase to a particular row to the array 205, the security controller 220 may change the group version value 202 to a new group version value. The group version data storage 201 may hold the new group version value and may no longer hold the previous group version value 202. The logical value of the new group version value may not be the logical value of the previous group version value 202. The erase may further comprise a physical erase of the contents of addresses (data) of the particular row of array 205 where the row version value of the particular row mismatches the new group version value. The security controller 220 may not process another erase request until the physical erase completes. A quick erase aspect of the disclosure may be present, making contents of the array 205 written prior to the erasure command unreadable even though the physical erase may not be complete. A read from a particular row may not be allowed when the row version value 212 for the particular row fails to match the group version value 202, which may be the new group version value following an erase request. Thus, even if the physical erase may not be complete, mismatching logical values of the group version value 202 and the row version value 212 may disallow a read to data stored prior to the erase request. In embodiments, when the new group version value matches the row version value 212, the physical memory may not be erased. When the new group version value fails to match the row version value 212 or in embodiments when no comparison is performed upon an erase request, a physical erase of the particular row may begin. Other possibilities are considered.

In an embodiment during a write to a particular row to the array 205, the security controller 220 may copy the group version value 202 to the row version value 212. The host 270 may send data to be written to the particular row to the data buffer 297 via the memory controller 280. The security controller 220 may write the data to be written to the particular row. The write of data may be from the data buffer 297 to the array 205. Other values in the particular row may remain, for example, when the data to be written is merely a subset of a row. The security controller 220 may clear the other values in the particular row in storage cells to which data is not to be written. Such clearing of the other values may occur if the security controller 220 finds that the row version value 212 differs from the current group version value 202. Clearing the other values in the particular row prevents writing into the subset of the row and then having read capability to other data in the particular row, since the new row version value 212 written now is the same as the group version value 202. Clearing of the other values may occur by writing a known pattern. The known pattern may be written to the data buffer 297 prior to writing the data to be written to the array 205.

In an embodiment during a write to a particular row to the array 205, the contents of the particular row may be accessed by the data buffer 297. The security controller 220 may compare the group version value 202 with the row version value 212 for the particular row. When the group version value 202 fails to match the row version value 212, the contents of the particular row may be cleared in the data buffer 297. The security controller 220 may copy the group version value 202 to the row version value 212 and write the data to be written in the data buffer 297. The contents of the data buffer 297 may be written to the particular row of the array 205. In an embodiment, a write request to a particular row may be allowed immediately after an erase request. Thus, even if the physical erase may not be complete, the logical value of the group version value 202 may be copied to the row version value 212 to permit data to be written to the particular row. However, since the remainder of the particular row has been cleared, subsequent reads from the particular row do not output data written by a previous write with the previous group version value.

In embodiments, the row version value 212 may correlate to data in storage cells in a subset of a row such as a particular byte, and may effectively be a row version value 212 for the particular byte of data. In the case of the row version value 212 correlating to data in a subset of a row, a particular row of the array 205 may include multiple row version values with each row version value 212 associated with the particular byte, for example. To write to the particular byte in the particular row, data may be written to the particular byte and other bits in the particular row may be cleared. If not cleared, data may be rendered unreadable by the mismatch between the group version value 202 and the row version value 212 for bytes written prior to the erasure command. One possibility includes accessing the particular row to a row buffer. If the row version value 212 for the particular byte mismatches the group version value 202, the particular byte may be cleared. The clearing may occur for every bit in the particular row where the row version value 212 associated with each bit, perhaps associated through a byte, mismatches the group version value 202. The group version value 202 may be copied to the row version value 212 for the particular byte in the particular row. The data to be written to the particular byte in the particular row may be written to the row buffer. The actual write to the particular byte in the particular row may occur from the row buffer to the particular byte in the particular row in the array 205. Other possibilities for writing data are considered.

Figure 3:
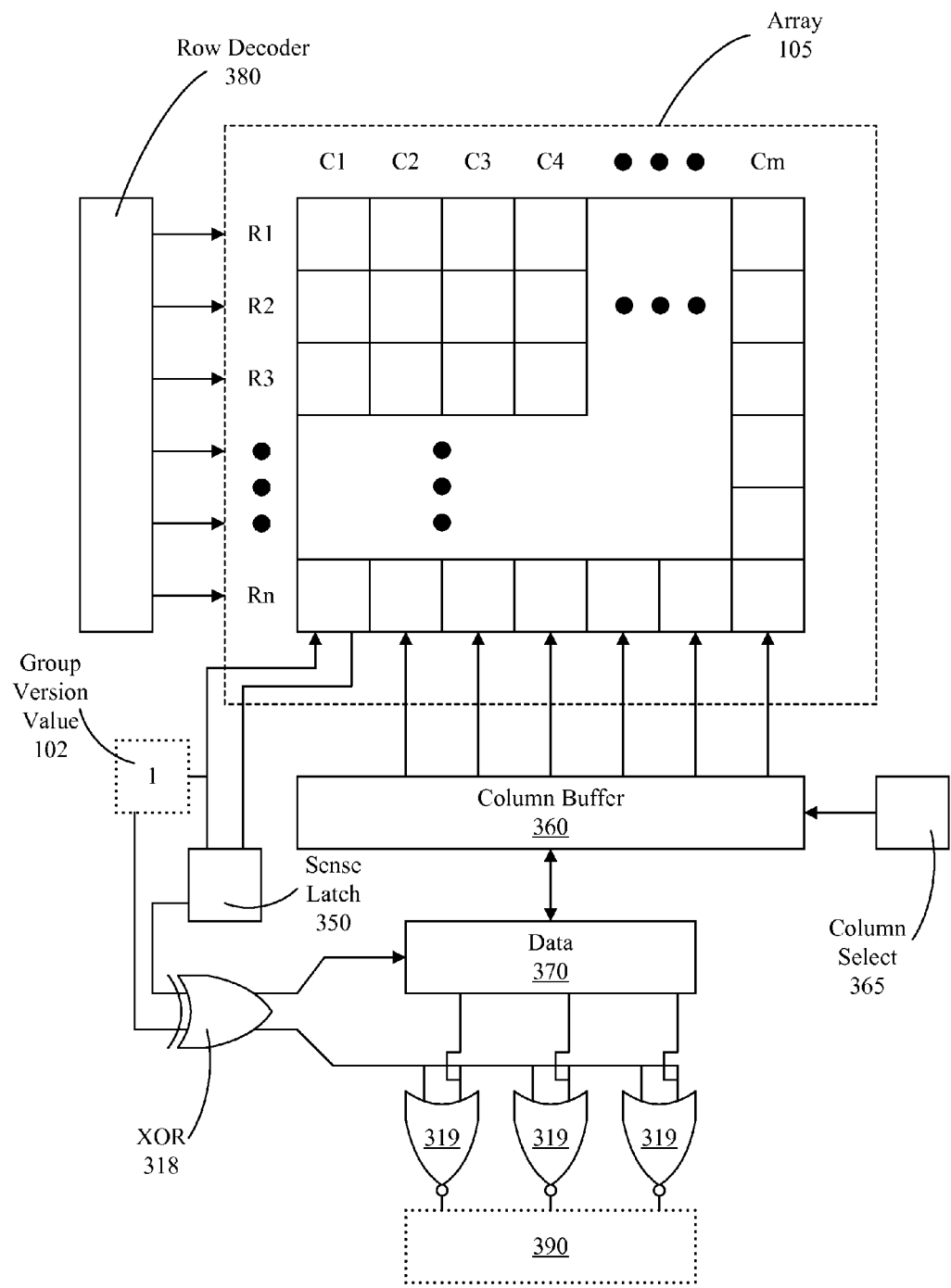
FIG. 3 diagrammatically depicts aspects of a memory device with quick erase capability.

FIG. 3 diagrammatically depicts aspects of a memory device with quick erase capability. FIG. 3 provides example aspects of the memory device and shows potential aspects of a security controller, address decoder, command decoder, or data buffer mentioned above. The array 105 and the group version value 102 from FIG. 1 are shown to help portray the interaction of the various potential aspects. When row version values are in column C1 for each row of the array 105, a sense latch 350 may exist to capture the row version value for a particular row of the array 105. During a read request from the particular row, the group version value 102 may be compared with a value of the sense latch 350 for the particular row. During a write request to the particular row, the group version value 102 may be copied to the row version value for the particular row and thus the value of the sense latch 350 may match the group version value 102. A column buffer 360 may access data 370 or access a sequence of bits of the array 105. A column select 365 may choose an appropriate column address of the array 105 to access. A row decoder 380 may choose an appropriate row address of the array 105 to access. A write command 390, for example, may thus be successfully completed. If XOR gate 318 finds, during a read, that the group version value 102 differs from the row version value (in sense latch 350) for an addressed row, NOR gates 319 may output "0"'s, regardless of data in data 370. FIG. 3 represents a potential way to design aspects of a memory device with quick erase capability, other possibilities are considered.

Figure 4:
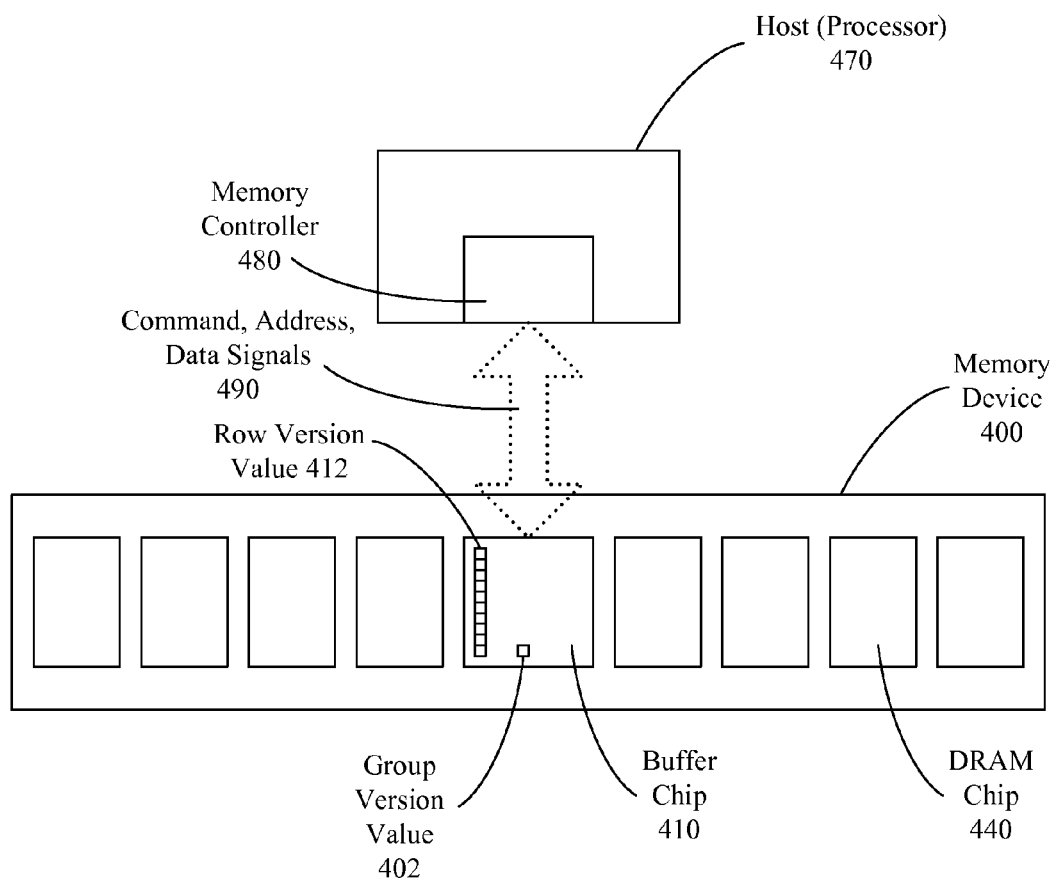
FIG. 4 diagrammatically depicts a memory device including multiple DRAM chips adapted to make data written prior to an erasure command unreadable.

FIG. 4 diagrammatically depicts a memory device including multiple DRAM chips adapted to make data written prior to an erasure command unreadable. The memory device 400 may be a dual inline memory module (DIMM). The memory device may include a buffer chip 410. The memory device 400 may be connected to a memory controller 480 connected to a host 470. In some embodiments, the host 470 may be a processor. A read, write, or erase request to the memory device 400 may derive from the host 470 via the memory controller 480, shown in FIG. 4 to be included in the host 470. Command, address, and data signals 490 may travel between the memory controller 480 and the memory device 400 including the buffer chip 410.

The memory device 400 may include at least one dynamic random access memory (DRAM) chip 440. In the case of the memory device 400 being a DIMM, many DRAM chips 440 may be included as shown in FIG. 4. Aspects of the buffer chip 410 may be similar to memory devices 100, 200 in FIG. 1-2. The buffer chip may be aware of the nature of the DRAM chips 440 being used, including the number of rows and number of columns. The buffer chip may have capability to personalize row decoding for the DRAM chips 440. The buffer chip may include a security controller similar to security controller 220 in FIG. 2. The buffer chip 410 may include a group version value 402. The group version value may be stored in a group version data storage similar to group version data storages 101, 201 in FIG. 1-2. The buffer chip 410 may include a row version value 412. A row version value 412 may exist for each row of the buffer chip 410. The row version value 412 for each row of the buffer chip 410 may serve as the row version value for a row on each DRAM chip 440. For example, if each DRAM chip 440 includes "n" rows, the buffer chip 410 may include "n" rows with a row version value 412 for each of the "n" rows. In effect, the DIMM 400 may have "n" rows with the buffer chip 410 having "n" row version values 412. In embodiments, the buffer chip 410 may include a row version value 412 for each row of each DRAM chip 440 or for a subset of each DRAM chip 440 such as a byte.

A read, write, or erase request to the memory device 400 may derive from the host 470 via the memory controller 480. Associated command, address, and data signals 490 to a particular DRAM chip 440 may travel between the memory controller 480 and the buffer chip 410. In an embodiment during a read from a particular row of the particular DRAM chip 440, the security controller may compare the group version value 402 with the row version value 412 associated with the particular row of the DRAM chip 440. When the group version value 402 matches the row version value 412 associated with the particular row of the DRAM chip 440, data may be output from the particular row of the particular DRAM chip 440. When the group version value 402 fails to match the row version value 412 associated with the particular row of the DRAM chip 440, data may not be output from the particular row of the particular DRAM chip 440.

In an embodiment during an erase to a particular row of the particular DRAM chip 440, the security controller may change the group version value 402 to a new group version value. The logical value of the new group version value may not be the logical value of the previous group version value 402. The erase may be a physical erase of the contents of addresses (data) of the particular row of the particular DRAM chip 440 where the row version value 412 associated with the particular row of the particular DRAM chip 440 mismatches the new group version value. The security controller may not process another erase request until the physical erase completes. A quick erase aspect of the disclosure may be present, making contents of the particular DRAM chip 440 unreadable even though the physical erase may not be complete. A read from a particular row of the particular DRAM chip 440 may not be allowed when the row version value 412 associated with the particular row of the particular DRAM chip 440 fails to match the group version value 402, which may be the new group version value following an erase request.

In an embodiment during a write to a particular row of the particular DRAM chip 440, the security controller may copy the group version value 402 to the row version value 412 associated with the particular row of the particular DRAM chip 440. The security controller may write the data to be written to the particular row of the particular DRAM chip

440. The security controller may clear the other values in the particular row of the DIMM in storage cells to which data is not to be written but that is associated to the row version value 412. Such clearing of the other values may occur if the security controller finds that the row version value 412 differs from the current group version value 202. Clearing the other values in the particular row of the DIMM may prevent having read capability to other DRAM chips in the particular row after writing into the particular DRAM chip 440. Clearing of the other values may occur by writing a known pattern. Other possibilities are considered including other ways of handling read, write, or erase requests in the context of memory devices such as DIMMs.

Figure 5:
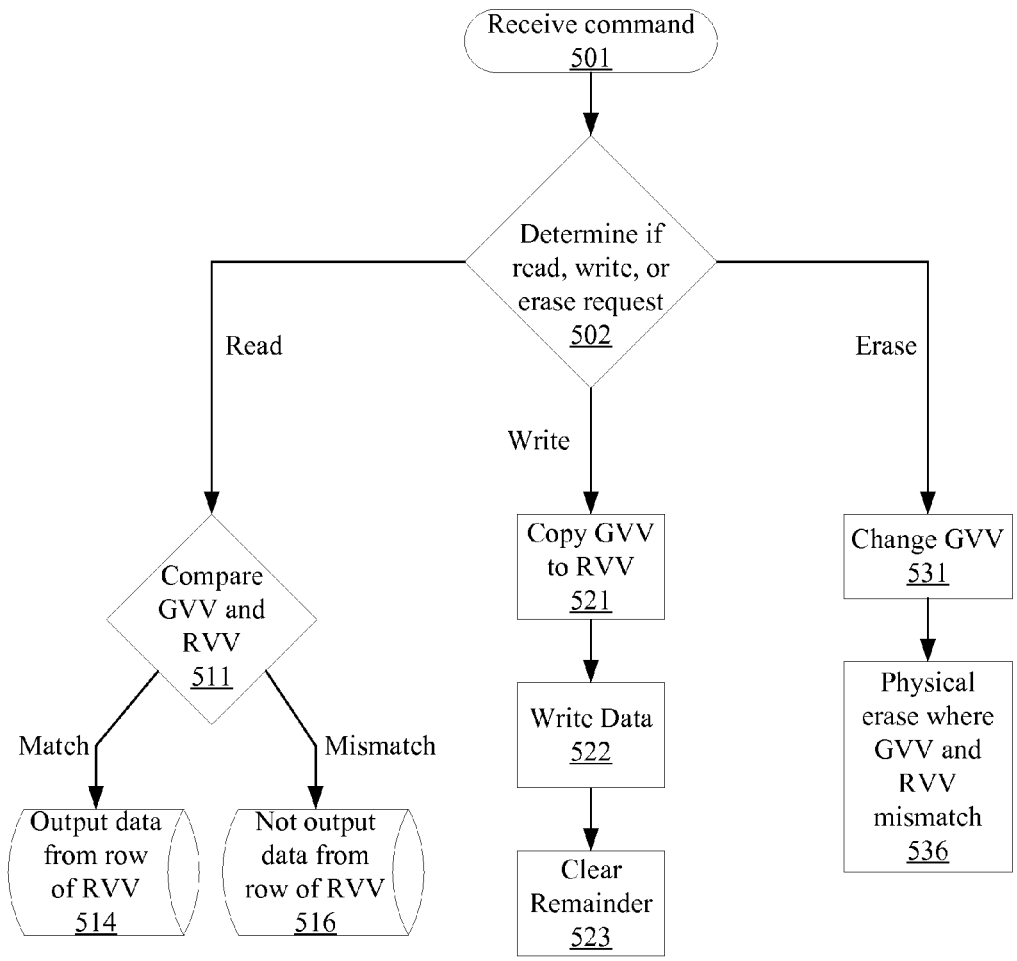
FIG. 5 is a flow chart illustrating an operation of a security controller securing the contents of a memory device according to an embodiment.

FIG. 5 is a flow chart illustrating an operation of a security controller securing the contents of a memory device according to an embodiment. Operation 500 begins by receiving a command at block 501. Block 502 determines whether the command is a read request, a write request, or an erase request.

If the command is a read request, a group version value and a row version value may be compared at block 511. The group version value and the row version value may be equal in logical values such as "0" or "1." The comparison may occur without changing either the group version value or the row version value. The comparison may result in a match or a mismatch. A match may describe equal values. A mismatch may describe unequal values. Other embodiments are considered with differing ways to perform the comparison. Performing the comparison may be characterized as applying evaluation logic. Reaching a result of a match or mismatch may be characterized as resolving a security ruling. If the comparison of the group version value with the row version value of a particular row results in a match, data may be output from the particular row at block 514. The data may be considered contents ruled readable. The read request may be fulfilled with the data. Contents may be delivered, for example, to a host making the request. If the comparison of the group version value with the row version value of a particular row results in a mismatch, data may not be output from the particular row at block 516. The data may be considered contents ruled unreadable. When the contents are ruled unreadable, a signal denial may be delivered, a known pattern such as all "0"'s may be delivered, or a random pattern may be delivered. Reads may occur normally with the group version value matching the row version value for each row.

If the command is an erase request, a group version value may be changed to a new group version value at block 531. The contents of addresses (data) written prior to the erasure command may be unreadable. An erasure may be initiated at block 536. The erasure may be a physical erase of the data where the row version value of a particular row mismatches the new group version value at block 536. Another erase request may not be accepted until the physical erase at block 536 is completed. If the new group version value matches the row version value of a particular row, the contents of addresses may not be erased from the particular row and may be readable or writable. In embodiments, a read request or a write request may be allowed before completing the physical erase. In embodiments, as an erase occurs to a first row, a read may occur to a second row even though data to the first row has not been physically erased if the row version value for the second row matches the group version value. In embodiments, as an erase occurs another erase command may not be allowed until every bit of data affected by the first erase command is either physically erased or overwritten. In embodiments, the group version value and a row version value may be compared, resulting in a match or a mismatch. The comparison may occur without changing any row version value. Other possibilities such as beginning to erase all rows upon changing the group version value are considered.

If the command is a write request, a group version value may be copied to the row version value at block 521. The group version value may then match the row version value. Data may be written at block 522. During a write request to a particular row, data written to the particular row may not write to the entire row. For example, if a row has 100 bits holding values, in some cases only 25 bits may be written to. In this case, the remaining 75 bits may be cleared. Clearing may occur if the write request changed the row version value, that is, if the group version value was not equal to the row version value prior to the copying of the group version value to the row version value. In embodiments, clearing may not occur if the write request did not change the row version value, that is, if the group version value was equal to the row version value prior to the write request. Likewise, if a row version value represents a byte, or other block of data, the byte may have its own version value and the other data in the row may not need to be cleared. In the example, clearing may constitute setting each of the 75 bits not being written to a "0," "1," or predetermined pattern of "0"'s and "1"'s. Thus, the remainder of the row may be cleared at block 523. With the write request fulfilled, the contents of the row may then be readable. Writes may always be allowed. Under standard operating conditions, writes happen normally with the group version value matching the row version value for each row.

In embodiments, a host may be allowed to read, write, or erase. The host may not be allowed to set a group version value. The host may not be allowed to set an item or row version value. Aspects of the disclosure may allow for this to happen indirectly, but not directly as the result of an action by the host.

What is claimed is:

1. A dynamic random access memory (DRAM) device, comprising:
    a data storage array on the DRAM device to store data, the data storage array including two or more rows, each row having two or more storage cells;
    a row version storage on the DRAM device for each row of the array to store a row version value;
    a group version data storage on the DRAM device to store a group version value; and
    a security controller on the DRAM device configured to respond to receiving an erase request by:
        disabling read access for all rows of the data storage array of the DRAM device, and
        changing the group version value to a new group version value, wherein a host is prohibited from setting a group version value stored in the group version data storage.

2. The memory device of claim 1, wherein the security controller is further configured to respond to receiving a read request specifying a particular row of the array by:
    comparing the group version value with a row version value for the particular row;
    outputting data from the particular row when the group version value matches the row version value for the particular row; and
    not outputting data from the particular row when the group version value fails to match the row version value for the particular row.

3. The memory device of claim 1, wherein the security controller is further configured to respond to receiving an erase request by:

initiating an operation to physically erase each row of the data storage array for which the group version value matches the row version value of a particular row.

4. The memory device of claim 3, wherein the security controller is further configured to:
respond to receiving a write request by allowing the write operation when the write request is received subsequent to the initiating of an operation to physically erase each row of the data storage array for which the group version value matches the row version value of a particular row and prior to completing the erase operation; and
respond to receiving a read request by allowing the read operation when the read request is received subsequent to the initiating of an operation to physically erase each row of the data storage array for which the group version value matches the row version value of a particular row and prior to completing the erase operation, wherein the read request specifies a row written subsequent to the initiating of the erase operation.

5. A memory device, comprising:
two or more dynamic random access memory (DRAM) chips, each chip having a memory array having two or more rows, each row having a plurality of storage cells;
a buffer chip having a at least one group version memory element to store a group version value;
a plurality of row version memory elements to store a row version values for respective rows of the DRAM chips; and
a security controller on the buffer chip configured to respond to a receiving a read request specifying a particular row by:
comparing the group version value with a row version value for the particular row,
outputting data from the particular row when the group version value matches the row version value for the particular row, and
outputting a pattern of bits that is different from data stored in the particular row when the group version value fails to match the row version value for the particular row.

6. The memory device of claim 5, wherein the security controller is further configured to respond to receiving an erase request by:
disabling read access for all rows of the DRAM devices, and
changing the group version value to a new group version value.

7. The memory device of claim 5, wherein the security controller is further configured to respond to receiving an erase request by:
initiating an operation to physically erase each row of the of the DRAM devices for which the group version value matches the row version value of a particular row.

8. The memory device of claim 7, wherein the security controller is further configured to:
respond to receiving a write request by allowing the write operation when the write request is received subsequent to the initiating of an operation to physically erase each row of the DRAM devices for which the group version value matches the row version value of a particular row and prior to completing the erase operation; and
respond to receiving a read request by allowing the read operation when the read request is received subsequent to the initiating of an operation to physically erase each row of the DRAM devices for which the group version value matches the row version value of a particular row and prior to completing the erase operation, wherein the read request specifies a row written subsequent to the initiating of the erase operation.

9. The memory device of claim 5, wherein the buffer chip includes three or more group version memory elements to store group version values and the security controller is configured to determine a group version value by performing a majority voting operation.

10. The memory device of claim 5, wherein the group version value is stored in a register with a critical charge insensitive to ionizing radiation.

11. The memory device of claim 5, wherein the buffer chip includes the plurality of row version memory elements to store row version values for respective rows of the DRAM chips.

12. The memory device of claim 5, wherein the security controller is further configured to respond to receiving a first erase request by rejecting the first erase request when:
the first erase request is received subsequent to a second erase request, and
an operation initiated in response to the second erase request to physically erase each row of the DRAM devices for which the group version value matches the row version value of a particular row is incomplete.

13. The memory device of claim 5, wherein the security controller is further configured to respond to receiving a write request specifying a particular row of the DRAM devices by:
copying the group version value to the row version storage for the particular row; and
writing data associated with the write request to one or more storage cells of the particular row.

14. The memory device of claim 13, wherein the security controller is further configured to respond to receiving the write request specifying the particular row of the DRAM devices by:
clearing any storage cell in the particular row not changed as a result of the writing data associated with the write request to the particular row.

15. The memory device of claim 14, wherein when the row version storage is for a first portion of the particular row, the clearing of any storage cell in the particular row not changed as a result of the writing data associated with the write request to the particular row is limited to storage cells of the first portion of the particular row.

16. The memory device of claim 1, wherein the security controller is further configured to respond to receiving a write request specifying a particular row of the array by:
copying the group version value to the row version storage for the particular row; and
writing data associated with the write request to one or more storage cells of the particular row.

17. The memory device of claim 16, wherein the security controller is further configured to respond to receiving the write request specifying the particular row of the array by:
clearing any storage cell in the particular row not changed as a result of the writing data associated with the write request to the particular row.

18. The memory device of claim 17, wherein when the row version storage is for a first portion of the particular row, the clearing of any storage cell in the particular row not changed as a result of the writing data associated with the write request to the particular row is limited to storage cells of the first portion of the particular row.

19. The memory device of claim 3, wherein the security controller is further configured to respond to receiving an erase request by rejecting the erase request when:
the erase request is received subsequent to the initiating of the operation to physically erase each row of the data storage array for which the group version value matches the row version value of a particular row and prior to completing the erase operation.

20. The memory device of claim 1, wherein the row version storage on the DRAM device for a particular row of the array is a storage cell of the particular row.

21. The memory device of claim 5, wherein a host is prohibited from setting a group version value stored in the group version data storage.

* * * * *